United States Patent
Asagi

(10) Patent No.: US 11,610,602 B2
(45) Date of Patent: Mar. 21, 2023

(54) MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Yoshinori Asagi, Kamakura Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/678,353

(22) Filed: Feb. 23, 2022

(65) Prior Publication Data
US 2023/0015636 A1   Jan. 19, 2023

(30) Foreign Application Priority Data

Jul. 13, 2021   (JP) .............................. JP2021-115887

(51) Int. Cl.
*G11B 5/54*   (2006.01)
*G11B 5/012*   (2006.01)

(52) U.S. Cl.
CPC .................................. *G11B 5/012* (2013.01)

(58) Field of Classification Search
CPC .... G11B 5/00; G11B 5/09; G11B 5/54; G11B 5/59633; G11B 5/59638; G11B 5/56; G11B 5/58
USPC ................................................... 360/75, 74.1
See application file for complete search history.

(56) References Cited

U.S. PATENT DOCUMENTS

| | | |
|---|---|---|
| 7,545,593 B1 | 6/2009 | Sun et al. |
| 7,616,397 B2 | 11/2009 | Hayakawa et al. |
| 7,633,698 B2 | 12/2009 | Finamore et al. |
| 8,094,403 B2 | 1/2012 | Wood et al. |
| 8,724,248 B2 | 5/2014 | Dhanda et al. |
| 9,564,157 B1 * | 2/2017 | Trantham ........... G11B 5/59627 |
| 9,875,757 B1 | 1/2018 | Liu et al. |
| 2007/0070542 A1 | 3/2007 | Suzuki et al. |
| 2010/0277827 A1 | 11/2010 | Wood et al. |

FOREIGN PATENT DOCUMENTS

| | | |
|---|---|---|
| JP | 2007-087558 A | 4/2007 |
| JP | 2010-262728 A | 11/2010 |

\* cited by examiner

*Primary Examiner* — Nabil Z Hindi
(74) *Attorney, Agent, or Firm* — Kim & Stewart LLP

(57) ABSTRACT

According to one embodiment, a magnetic disk device includes a magnetic disk, a magnetic head, an electric power supply section, a control section, and an address storage section. The control section reads data from the magnetic disk by means of the read head on the basis of the address stored in the address storage section at predetermined timing, and writes the read data to the magnetic disk by means of the write head without suppressing the magnetic field range.

10 Claims, 7 Drawing Sheets

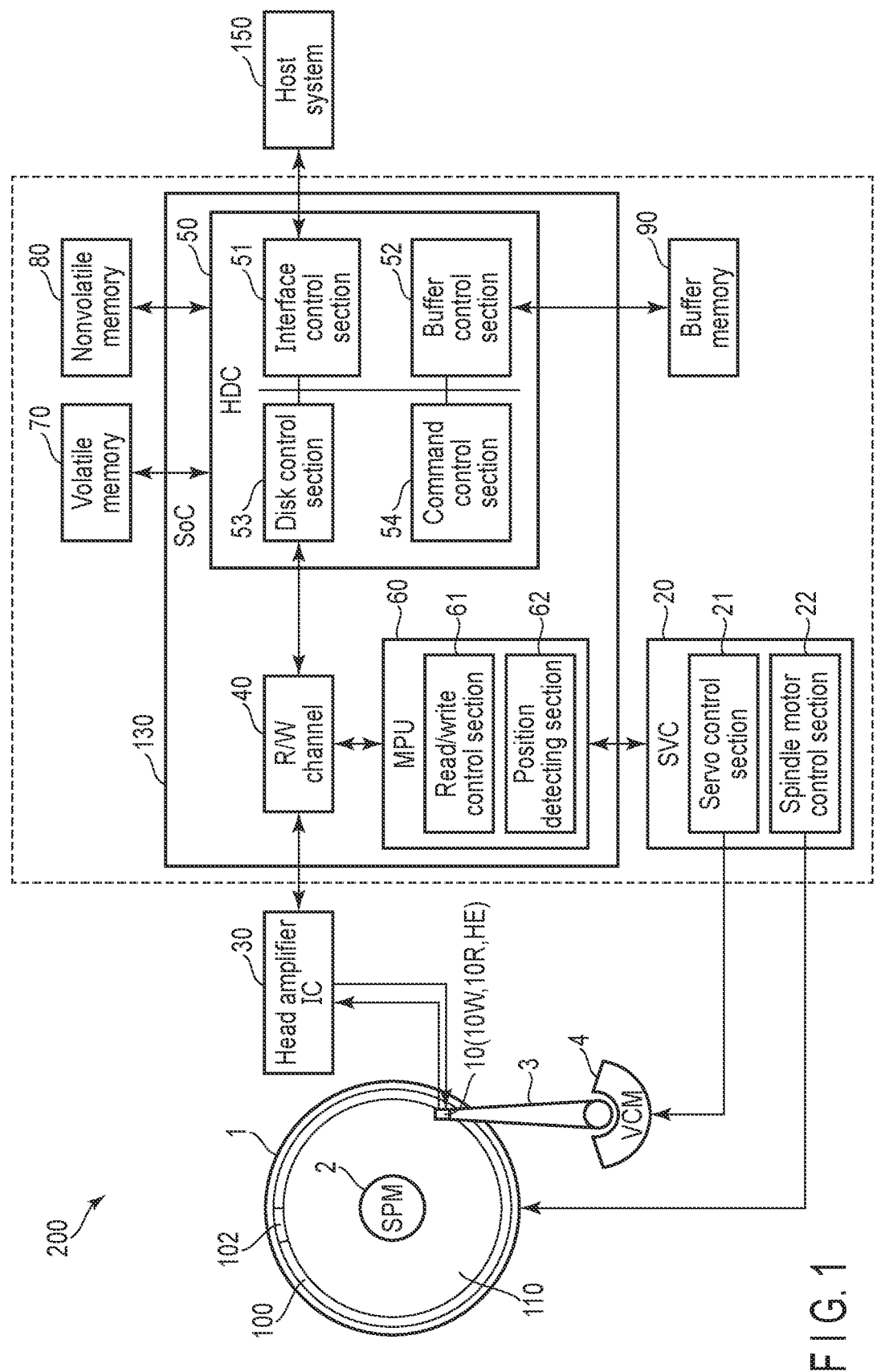
F I G. 1

| Address | State information |
|---|---|
| xxx~xxx | Normal |
| xxx~xxx | Surface unevenness |
| xxx~xxx | Convex part |

MAGNETIC DISK DEVICE

CROSS-REFERENCE TO RELATED APPLICATIONS

This application is based upon and claims the benefit of priority from Japanese Patent Application No. 2021-115887, filed Jul. 13, 2021, the entire contents of which are incorporated herein by reference.

FIELD

Embodiments described herein relate generally to a magnetic disk device.

BACKGROUND

Enhancement of the storage capacity of a magnetic disk device is now in demand. For this reason, in order to enhance the capacity of the magnetic disk device, narrowing of the track pitch of the magnetic disk for the purpose of a higher degree of densification of recording density is carried out.

As already described above, when the recording density of the magnetic disk is increased to a higher degree, it is possible to increase the storage capacity of the magnetic disk device. It is possible to realize the enhancement of the storage capacity as described above, on the other hand, a situation in which the rate of the influence of the magnetic field on the adjacent track is also increased occurs when data is recorded. More specifically, when a magnetic disk device is subjected to a certain vibration (shock) applied from outside, the write head is swung above the track. There is sometimes a case where the swing width (offset amount) becomes larger to thereby intrude upon data of the adjacent track. In order to prevent this from occurring, processing of providing a threshold to the offset and, when the threshold is exceeded, inhibiting recording of data is carried out. Although when the vibration (shock) is one-shot vibration (shock), recording of data is enabled after one rotation of the magnetic disk, in the case of vibration (shock) of a long duration, the state where recording of data is not permitted is continued. Accordingly, the performance of data recording of the magnetic disk device is deteriorated.

BRIEF DESCRIPTION OF THE DRAWINGS

FIG. 1 is a view showing an example of the configuration of a magnetic disk device according to this embodiment.

DETAILED DESCRIPTION

Figures 2, 3:
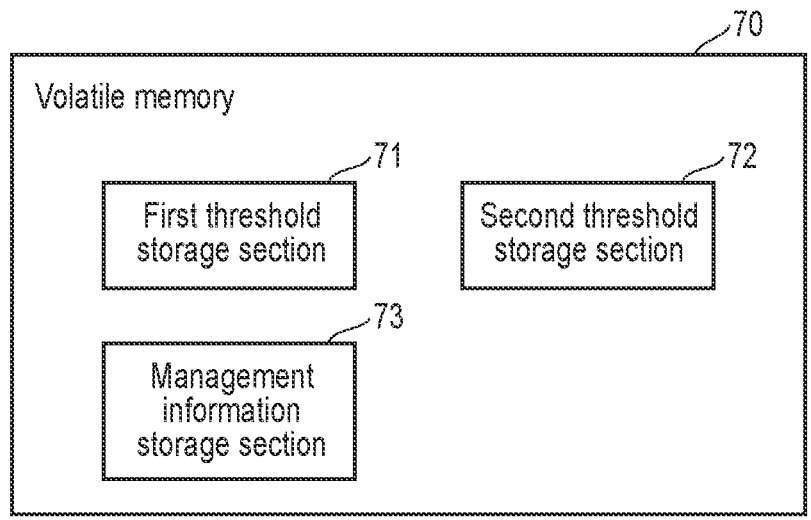
FIG. 2 is a view showing examples of information to be stored in a volatile memory according to this embodiment.
FIG. 3 is a view showing examples of state information to be stored in a system area according to this embodiment.

In general, according to one embodiment, a magnetic disk device includes a magnetic disk; a magnetic head including a read head which reads data from the magnetic disk, a write head which writes data to the magnetic disk, and a heater which adjusts an amount of levitation of each of the read head and the write head relative to the magnetic disk; an electric power supply section which supplies electric power to the read head, the write head, and the heater; a control section which controls read/write of data from/to the magnetic disk and suppresses a magnetic field range of the write head according to an offset amount of the write head at the time of write of the data; and an address storage section which stores therein an address of the magnetic disk to which data is written by suppressing the magnetic field range. The control section reads data from the magnetic disk by means of the read head on the basis of the address stored in the address storage section at predetermined timing, and writes the read data to the magnetic disk by means of the write head without suppressing the magnetic field range.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. Further, in the specification and drawings, corresponding elements are denoted by like reference numerals, and a detailed description thereof may be omitted unless otherwise necessary.

FIG. 1 is a view showing an example of the configuration of a magnetic disk device according to an embodiment.

As shown in FIG. 1, a magnetic disk device 200 is configured as, for example, a hard disk drive (HDD), and includes a magnetic disk 1, spindle motor (SPM) 2, actuator 3, voice coil motor (VCM) 4, magnetic head 10, servo combo (SVC) 20, head amplifier IC 30, R/W channel 40, hard disk controller (HDC) 50, microprocessor (MPU) 60, volatile memory 70, and nonvolatile memory 80. Further, the magnetic disk device 200 is connectable to a host system 150. The magnetic head 10 includes a write head 10W, read head 10R, and heater HE. The servo combo 20, R/W channel 40, HDC 50, and MPU 60 may also be incorporated in a one-chip integrated circuit.

The magnetic disk 1 includes a substrate constituted of, for example, a non-magnetic material and formed into a disk-like shape. On each surface of the substrate, a soft magnetic layer constituted of a material exhibiting soft magnetic properties and serving as a foundation layer, magnetic recording layer having magnetic anisotropy in a direction perpendicular to the disk surface and formed in the upper layer of the soft magnetic layer, and protective film layer formed in the upper layer of the magnetic recording layer are stacked on top of each other in layers in the order mentioned. Here, the layers closer to the magnetic head 10 are defined as upper layers.

The magnetic disk 1 is fixed to the spindle motor (SPM) 2 and is rotated by the SPM 2 at a predetermined rotational speed. It should be noted the number of the magnetic disk 1 not limited to one, and a plurality of magnetic disks 1 may also be provided on the SPM 2. The SPM 2 is driven by a drive current (or drive voltage) to be supplied from the servo combo 20. Data patterns are recorded/reproduced on/from the magnetic disk 1 by the magnetic head 10. The magnetic disk 1 includes a system area 100 and data area 110. The system area 100 includes a state information storage section 102 storing therein the state of the disk surface of the magnetic disk 1 details of which are to described later. The system area 100 is provided at, for example, a part of the magnetic disk 1 on the outermost circumference or innermost circumference in the radial direction. In the data area 110, data is stored.

The actuator 3 is swingably provided and magnetic head 10 is supported on the tip end part thereof. The actuator 3 is swung by the voice coil motor (VCM) 4, whereby the magnetic head 10 is moved to a position on the desired track of the magnetic disk 1, and is positioned there. The VCM 4 is driven by a drive current (or drive voltage) to be supplied thereto from the servo combo 20.

As described above, the magnetic head 10 includes the write head 10W and read head 10R. The write head 10W writes data to the magnetic disk 1. The read head 10R reads data from the magnetic disk. The heater HE adjusts the amount of levitation (in other words, gap between the write head 10W or read head 10R and disk surface) of the write head 10W or read head 10R from the disk surface of the magnetic disk 1.

The servo combo 20 includes a servo control section 21 and spindle motor control section 22. The servo control section 21 controls the voice coil motor 4 according to the control of the MPU 60, and detects head position information concerning the magnetic head 10. This detected head position information is output to the MPU 60. The head position information includes, in this embodiment, information indicating the offset amount by which the position of the write head on the magnetic disk 1 deviates from the target position to which the write head is to be positioned. The spindle motor control section 22 controls the spindle motor 2 according to the control of the MPU 60. By driving the voice coil motor 4, the magnetic head 10 is positioned to a target track on the magnetic disk 1.

The head amplifier IC (electric power supply section) 30 is configured to supply a write signal (write current) corresponding to the write data to be supplied thereto from the R/W channel 40 to the write head 10W. Further, the head amplifier IC 30 amplifies a read signal to be output from the read head 10R and transmits the amplified read signal to the R/W channel 40. Furthermore, the head amplifier IC 30 adjusts a voltage to be applied to the heater HE to thereby adjust the amount of levitation of the write head 10W or read head 10R from the disk surface of the magnetic disk 1.

The R/W channel 40 is a signal processing circuit configured to process a signal relating to read/write. The R/W channel 40 includes a read channel configured to execute signal processing of read data and write channel configured to execute signal processing of write data. The R/W channel 40 converts a read signal to be input thereto from the read head 10R through the head amplifier IC 30 into digital data and decodes read data from the digital data. The R/W channel 40 encodes write data to be transferred thereto from the HDC 50 and transfers the encoded write data to the write head 10W through the head amplifier IC 30.

The HDC 50 includes an interface control section 51, buffer control section 52, disk control section 53, and command control section 54. Further, the HDC 50 controls write of data to the magnetic disk 1 and read of data from the magnetic disk 1 through the magnetic head 10, servo combo 20, head amplifier IC 30, R/W channel 40, and MPU 60. More specifically, the interface control section 51 constitutes an interface between the magnetic disk device 200 and host system 150. The buffer control section 52 temporarily retains a command transferred from the interface control section 51 and command to be transferred to the interface control section 51 in a buffer 90. The disk control section 53 executes write of data to the magnetic disk 1 and processing of data to be read from the magnetic disk 1. The command control section 54 controls a command transferred from the buffer control section 52. Owing to these control sections, the HDC 50 functions as a host interface controller configured to receive a signal transferred from the host system 150 and transfer a signal to the host system 150. Further, the HDC 50 receives a command (write command, read command, and the like) transferred from the host system 150 and transmits the received command to the MPU 60.

The MPU 60 is a main controller of the magnetic disk device 200 and includes a read/write control section 61 and position detecting section 62. The read/write control section 61 controls a read/write operation. The position detecting section 62 detects the position of the magnetic head 10 on the basis of head position information to be output from the SVC 20.

The volatile memory 70 is, for example, a DRAM. Regarding the volatile memory 70, information to be stored in the volatile memory 70 will be described later with reference to FIG. 2. The nonvolatile memory 80 is, for example, a flash ROM. The nonvolatile memory 80 stores therein, for example, a program necessary for the processing of the MPU 60. Details of the contents of the program will be described later with reference to FIG. 7 and FIG. 10.

FIG. 2 is a view showing examples of information to be stored in a volatile memory 70.

Figure 4:
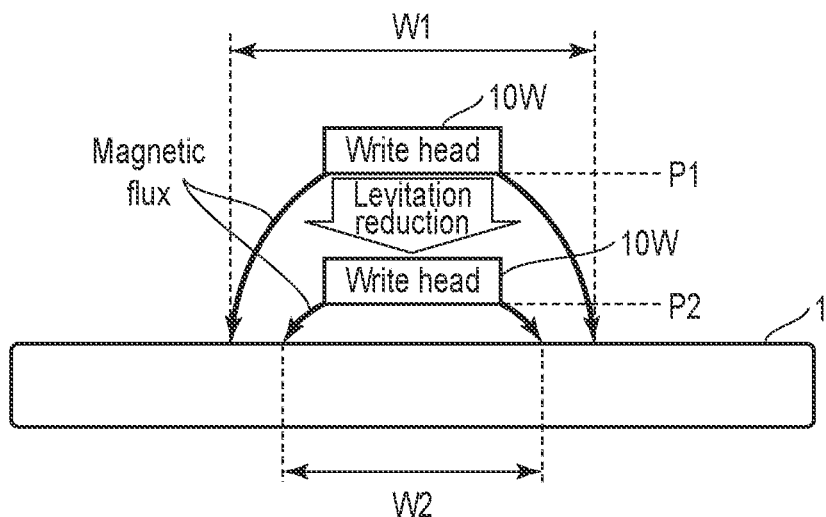
FIG. 4 is a view for explaining an example of magnetic field suppression control of suppressing a magnetic field occurring at the time of write of data according to this embodiment.
Figure 5:
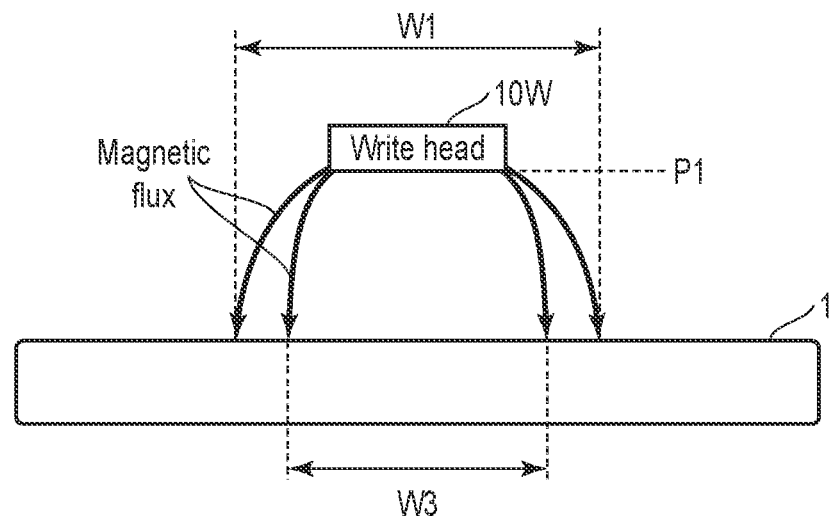
FIG. 5 is a view for explaining an example of magnetic field suppression control of suppressing a magnetic field occurring at the time of write of data according to this embodiment.
Figure 6:
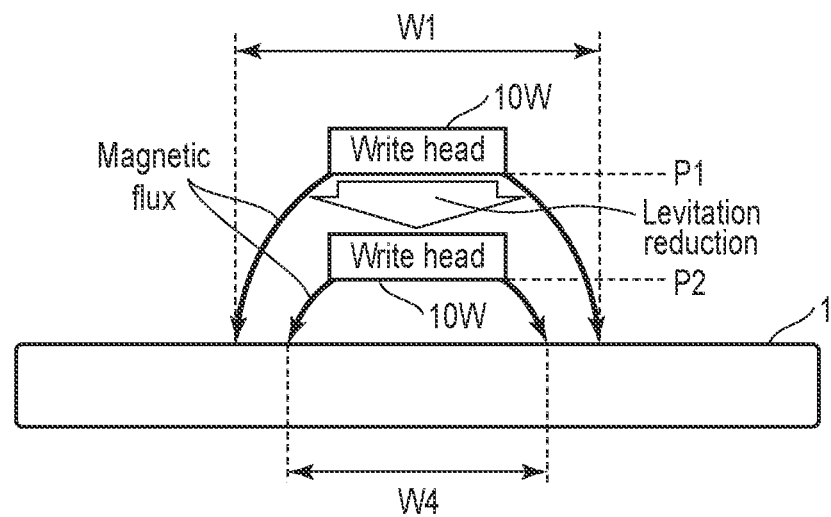
FIG. 6 is a view for explaining an example of magnetic field suppression control of suppressing a magnetic field occurring at the time of write of data according to this embodiment.

As shown in FIG. 2, the volatile memory 70 includes a first threshold storage section 71, second threshold storage section 72, and management information storage section 73. The first threshold storage section 71 stores therein a first threshold. The first threshold is a value indicating an offset amount by which data stored in the adjacent track is eroded by the influence of write of data carried out by the write head 10W in the normal levitated state. The second threshold storage section 72 stores therein a second threshold. The second threshold is an offset amount greater than the first threshold and is a value indicating an offset amount by which data stored in the adjacent track is eroded by the influence of write of data even when write of data based on magnetic field suppression control to be described later with reference to FIGS. 4 to 6 is carried out. It should be noted that regarding the first threshold and second threshold, for example, when the magnetic disk device 200 is powered on, the first threshold and second threshold stored in some places inside the magnetic disk device 200 are configured in such a manner as to be respectively retained in the first threshold storage section 71 and second threshold storage section 72. The management information storage section 73 stores therein management information. The management information is information indicating the address of data written by executing the magnetic field suppression control.

FIG. 3 is a view showing examples of state information to be stored in the state information storage section 102.

The state information is information indicating the state of the disk surface of the magnetic disk 1. As shown in FIG. 3, the state information items 102a are stored in correlation with the addresses of the data area 110 of the magnetic disk 1. The state information items 102a respectively indicate, in this embodiment, three states of the disk surface, i.e., "normal", "surface unevenness", and "convex part". The state "normal" indicates that the disk surface is formed into an appropriate state. The state "surface unevenness" indicates that the disk surface is formed into a state where the magnetic field is liable to change. The state "convex part" indicates that a protrusion is formed on the disk surface. As described above, the states of the disk surface are stored in correlation with the addresses of the data area 110. It should be noted that the state information items 102a are created by carrying out an inspection of the disk surface of the magnetic disk 1 at the time of the inspection before shipment, and on the basis of the inspection result, and are then stored in the state information storage section 102 of the system area 100.

Each of FIGS. 4 to 6 is a view for explaining an example of magnetic field suppression control of suppressing a magnetic field occurring at the time of write of data. FIGS. 4 to 6 respectively show the cases where the magnetic field is suppressed by the conditions C1 to C3. Suppression of the magnetic field is executed for example, when vibration is applied at the time of data write, if an offset of the magnetic head 10 occurs, more specifically, if an offset of the write head 10W occurs.

FIG. 4 is a view showing an example of the magnetic field suppressing operation at the time of the condition C1.

The condition C1 relates to the case where the levitation amount of the write head 10W is reduced. The levitation amount is, in other words, a distance from the write head 10W to the disk surface of the magnetic disk 1. Adjustment of the levitation amount is realized by changing the voltage to be applied to the heater HE (illustration is omitted in FIG. 4) provided at the part from the head amplifier IC 30 to the inside of the magnetic head 10 and in the vicinity of the write head 10W on the basis of an instruction of the MPU 60. As shown in FIG. 4, in the case where the write head 10W at the normal time is located at the position P1 at the time of data write, when the write-expanded width of the write head 10W is set as W1, if the levitation amount of the write head 10W is reduced, in other words, if the distance between the write head 10W and disk surface is reduced to thereby make the write head 10W located at the position P2, the write-expanded width becomes a width W2 (<W1). As described above, by reducing the levitation amount of the write head 10W from the position P1 to the position P2, it becomes possible to reduce the write-expanded width. Accordingly, in the case of the condition C1, it becomes possible for the magnetic disk device 200 to suppress the magnetic field occurring at the time of data write.

FIG. 5 is a view showing an example of the magnetic field suppressing operation at the time of the condition C2.

The condition C2 relates to the case where the current (or voltage) to be supplied to the write head 10W is reduced. Adjustment of the current to be supplied to the write head 10W is realized by changing the value of the current to be supplied from the head amplifier IC 30 to the write head 10W on the basis of an instruction of the MPU 60. As shown in FIG. 5, at the time of data write, in the case where a current of the current value at the normal time is supplied to the write head 10W, when the write-expanded width of the write head 10W is set as W1, if the current to be supplied to the write head 10W is reduced, the write-expanded width becomes a width W3 (<W1). As described above, by reducing the current to be supplied to the write head 10W, it becomes possible to reduce the write-expanded width. Accordingly, in the case of the condition C2 too, it becomes possible for the magnetic disk device 200 to suppress the magnetic field occurring at the time of data write as in the case of the condition C1.

FIG. 6 is a view showing an example of the magnetic field suppressing operation at the time of the condition C3.

The condition C3 relates to the case where the levitation amount of the write head 10W is reduced and current (or voltage) to be supplied to the write head 10W is reduced. That is, the condition C3 relates to the case where the condition C1 and condition C2 are combined with each other. By reducing the levitation amount of the write head 10W from the position P1 to the position P2 and reducing the current to be supplied to the write head 10W, it becomes possible to reduce the write-expanded width. Accordingly, in the case of the condition C3 too, it becomes possible for the magnetic disk device 200 to suppress the magnetic field occurring at the time of data write as in the case of the condition C1 or C2.

Further, it is possible to set the levitation amount of the write head 10W and value of the current to be supplied to the write head 10W which are described above with reference to FIGS. 4 to 6 according to the situation of, for example, the medium characteristics (already-described "normal", "surface unevenness") of the magnetic disk 1, medium protrusion (already-described "convex part"), levitation margin, writability securement or the like.

Figure 7:
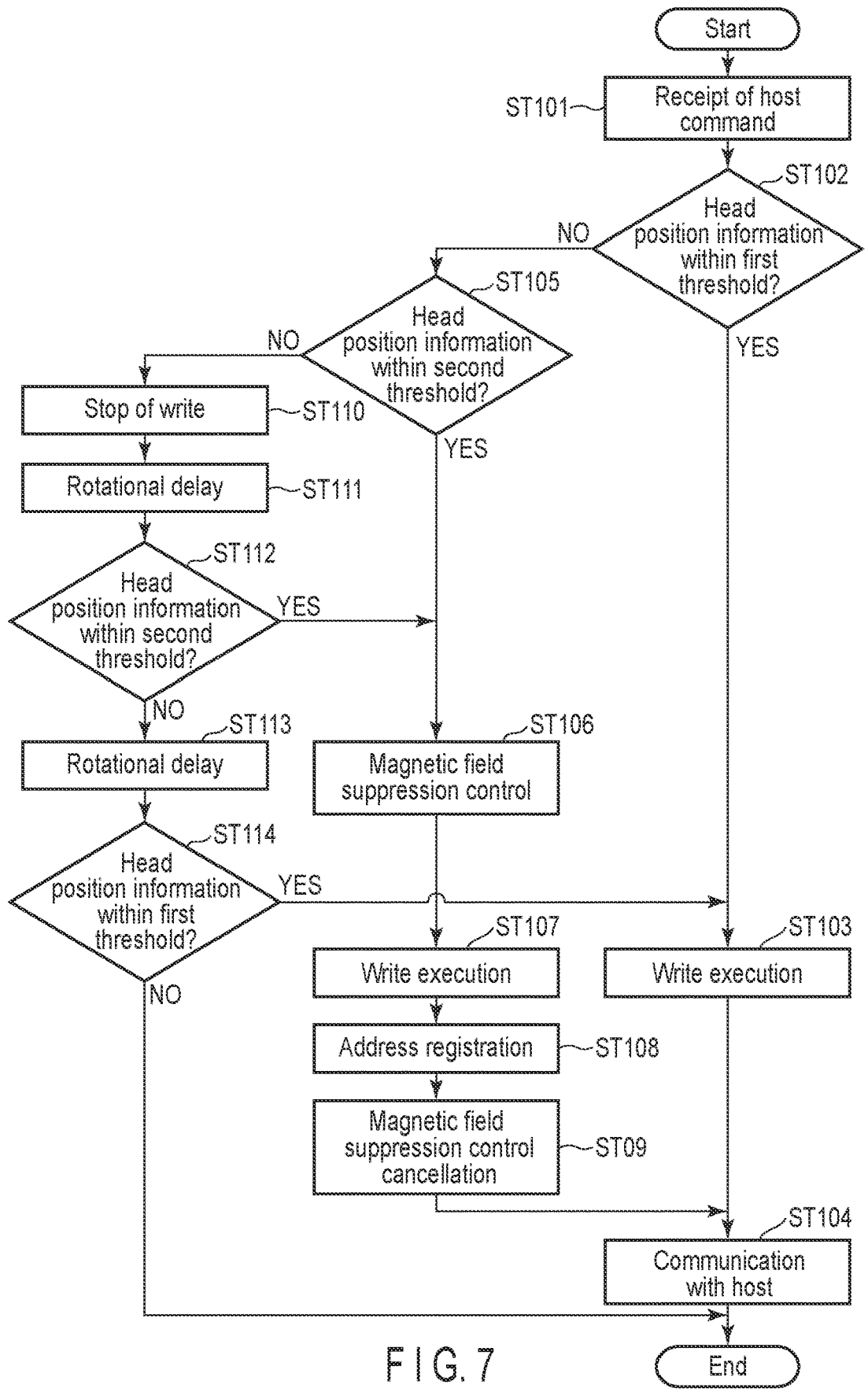
FIG. 7 is a flowchart showing an example of processing to be executed by the MPU at the time of data write according to this embodiment.

Next, the processing to be executed at the time of data write will be described. FIG. 7 is a flowchart showing an example of processing to be executed by the MPU 60 at the time of data write.

As shown in FIG. 7, upon receipt of a host command (in this embodiment, write command) (ST101), the MPU 60 determines whether or not the head position information is within the first threshold (ST102). More specifically, the MPU 60 determines whether or not an amount of the offset from the target position included in the head information is within the first threshold stored in the first threshold storage section 71. Upon determination that the offset amount is within the first threshold (ST102: YES), the MPU 60 executes write of data (ST103) and makes a host-response (ST104). That is, the MPU 60 transmits write completion information to the host system 150.

On the other hand, upon determination that the head position information is not within the first threshold (ST102: NO), the MPU 60 determines whether or not the head position information is within the second threshold (ST105). More specifically, the MPU 60 determines whether or not the amount of the offset from the target position included in the head position information is within the second threshold stored in the second threshold storage section 72. Upon determination that the offset amount is within the second threshold (ST105: YES), the MPU 60 executes magnetic field suppression control (ST106). That is, the MPU 60 executes control of suppressing the magnetic field occurring at the time of data write by using one of the methods of the conditions C1 to C3 already described with reference to FIGS. 4 to 6.

Here, how one of the conditions C1 to C3 is selected will be described below. In this embodiment, the MPU 60 selects one of the conditions C1 to C3 on the basis of the state information items 102a (see FIG. 3) stored in the state information storage section 102. For example, when writing data to the area of the state of the convex part, the MPU 60 selects the condition C2. The MPU 60 selects the condition C2 in order to avoid a possibility of the write head 10W coming into contact with the protrusion, the possibility being attributable to the protrusion included in the area concerned. As described above, it is possible to set the magnetic field suppression control according to the state of the disk surface of the magnetic disk 1.

After executing the magnetic field suppression control as described above, the MPU 60 executes write of data (ST107). Next, the MPU 60 registers the address (ST108). More specifically, the MPU 60 stores an address of data written by executing the magnetic field suppression control in the management information storage section 73. Next, the MPU 60 cancels the magnetic field suppression control (ST109) and makes a host-response (ST104).

Further, upon determination that the head position information is not within the second threshold (ST105: NO), the MPU 60 stops write (ST110). Then, the MPU 60 carries out rotational delay of the magnetic disk 1 (ST111) and determines whether or not the head position information is within the second threshold (ST112). When it is determined by the MPU 60 that the head position information is within the second threshold (ST112: YES), the processing is advanced to already-described step ST106, then the MPU 60 carries out magnetic field suppression control and thereafter executes write of data (steps ST106 to ST109, and ST104).

Further, upon determination that the head position information is not within the second threshold (ST112: NO), the MPU 60 carries out rotational delay of the magnetic disk 1 (ST113), and then MPU 60 determines whether or not the head position information is within the first threshold (ST114). When it is determined by the MPU 60 that the head position information is within the first threshold (ST114: YES), the processing is advanced to already-described step ST103, and MPU 60 executes write of data (ST103) and transmits write completion information to the host (ST104). Upon determination that the head position information is not within the first threshold (ST114: NO), the MPU 60 terminates the processing.

Figure 8:
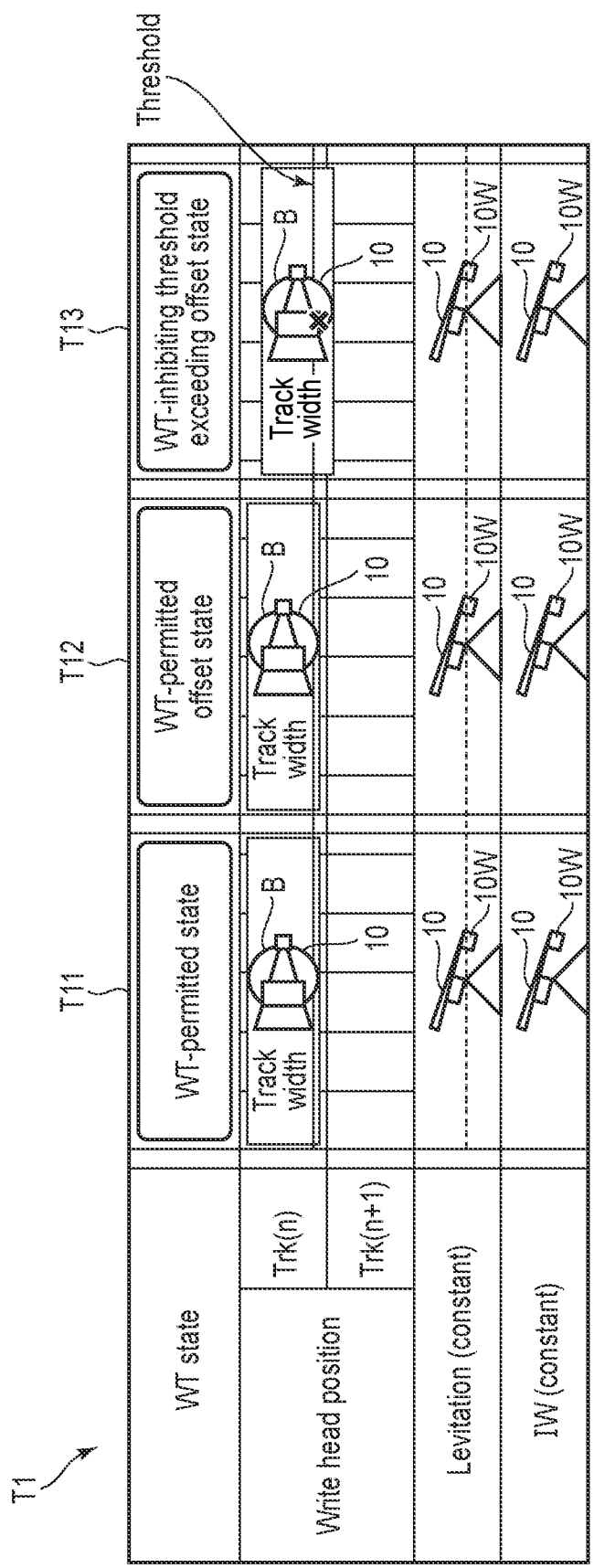
FIG. 8 is a view for explaining examples of magnetic field suppression control corresponding to a threshold of an offset amount and the write state according to another embodiment.
Figure 9:
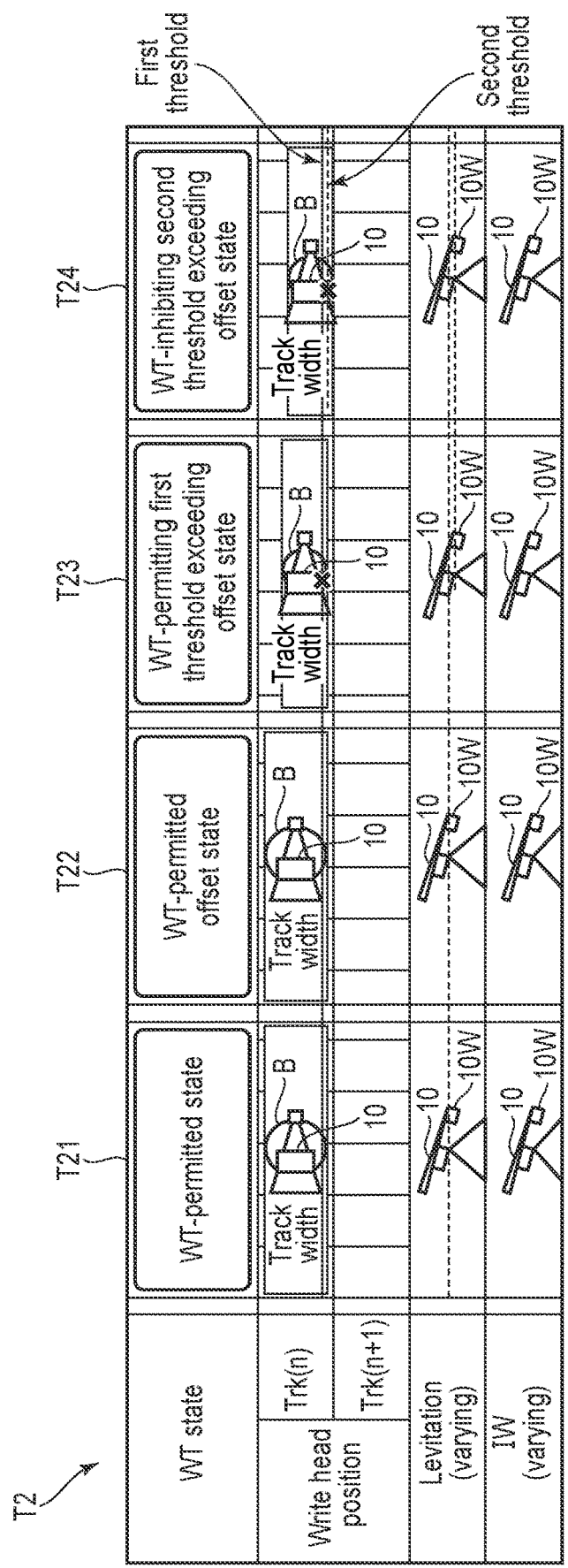
FIG. 9 is a view for explaining examples of magnetic field suppression control corresponding to a threshold of an offset and the write state according to this embodiment.

Next, an example of the magnetic field suppression control corresponding to the threshold of the offset amount and write state will be described. FIG. 8 shows the case of another embodiment to which the technique of this embodiment is not applied, and FIG. 9 shows the case of this embodiment.

First, another embodiment will be described. Another embodiment relates to the case where the number of the write-inhibiting threshold of the offset amount of the write head 10W is one.

As indicated by a symbol T1, the write head position, levitation (constant), and IW (current) (constant) are shown according to the write (WT) state. As the write states, the WT-permitted state T11, write-permitted offset state T12, and write-inhibiting threshold exceeding offset state T13 are shown. The write head 10W is positioned on an arbitrary track Trk (n), and a track Trk (n+1) is adjacent to this track Trk (n). Further, the magnetic field B indicates the range of the magnetic field of the write head 10W. Levitation indicates a levitation amount of the write head 10W, current indicates an amount of a current to be made to flow through the write head 10W and, the levitation amount and current are each constant because magnetic field suppression control is not executed in this another embodiment.

As shown in FIG. 8, in the write-permitted state T11, the track width of the track Trk (n) and range of the magnetic field B are approximately coincident with each other. There is sometimes a case where the magnetic disk device is subjected to a certain shock at the time of write of data and write head 10W is offset. The case where the offset amount does not exceed the threshold is the case where the range of the magnetic field B is shifted from the track width of the track Trk (n) and slightly includes the track width of the track Trk (n+1) as in the write-permitted offset state T12. The amount of the shift is small, and hence the track Trk (n+1) is not adversely affected. However, when the offset amount exceeds the threshold, the shift of the range of the magnetic field B from the track width of the track Trk (n) becomes larger and the range of the magnetic field B includes a considerable part of the track width of the track Trk (n+1) as in the write-inhibiting threshold exceeding offset state T13. In such a state, the adjacent track Trk (n+1) is adversely affected and data stored in the track Trk (n+1) is eroded. In order to prevent such a state from being brought about, when the offset amount exceeds the threshold, processing of inhibiting recording of data is carried out. However, when such vibration is continued, the state where data recording of the magnetic disk device is not permitted is continued and data recording performance is greatly deteriorated.

Next, this embodiment will be described. This embodiment relates to the case where the number of thresholds of the offset amount of the write head 10W is two as described previously, i.e., the first threshold and second threshold.

As indicated by a symbol T2, as in the case of the symbol T1, the write head position, levitation (varying), and IW (current) (varying) are shown according to the write (WT) state. As the write states, the WT-permitted state T21, write-permitted offset state T22, write-permitting first threshold exceeding offset state T23, and write-inhibiting second threshold exceeding offset state T24 are shown. The write head 10W is positioned on an arbitrary track Trk (n), and a track Trk (n+1) is adjacent to this track Trk (n). Further, as in the case of FIG. 8, the magnetic field B indicates the range of the magnetic field of the write head 10W, levitation indicates the levitation amount of the write head 10W, and current indicates an amount of a current to be supplied to the write head 10W.

As shown in FIG. 9, in the write-permitted state T21, the track width of the track Trk (n) and range of the magnetic field B are approximately coincident with each other, in the write-permitted offset state T22, the range of the magnetic field B is shifted from the track width of the track Trk (n) and slightly includes the track width of the track Trk (n+1), these states being identical to the case of FIG. 8. In the write-permitting first threshold exceeding offset state T23, the offset amount exceeds the first threshold, and hence the range of the magnetic field B is shifted from the track width of the track Trk (n) and includes a part of the track width of the track Trk (n+1). However, the levitation amount of the write head 10W is reduced, i.e., the distance between the write head 10W and disk surface of the magnetic disk 1 is reduced, and hence the influence of the magnetic field is suppressed. Further, in place of the adjustment of the levitation amount of the write head 10W or together with the adjustment of the levitation amount of the write head 10W, an adjustment may be carried out so as to reduce the current to be supplied to the write head 10W. As described above, when the offset amount of the write head 10W exceeds the first threshold, by executing the magnetic field suppression control, even if the offset amount exceeds the first threshold, the adjacent track Trk (n+1) becomes unaffected and write of data is enabled. When the offset amount becomes further greater to bring about the write-inhibiting second threshold exceeding offset state 124, the shift of the range of the magnetic field B from the track width of the track Trk (n) becomes greater and, even by executing the magnetic field suppression control, the range of the magnetic field B becomes so great as to include a considerable part of the track width of the track Trk (n+1), and hence processing of inhibiting recording of data is carried out.

As described above, it is possible for the magnetic disk device 200 to continue write of data, by executing the magnetic field suppression control, even when the offset amount exceeds the first threshold until the offset amount exceeds the second threshold. Accordingly, the magnetic disk device 200 can improve the data recording performance.

Figure 10:
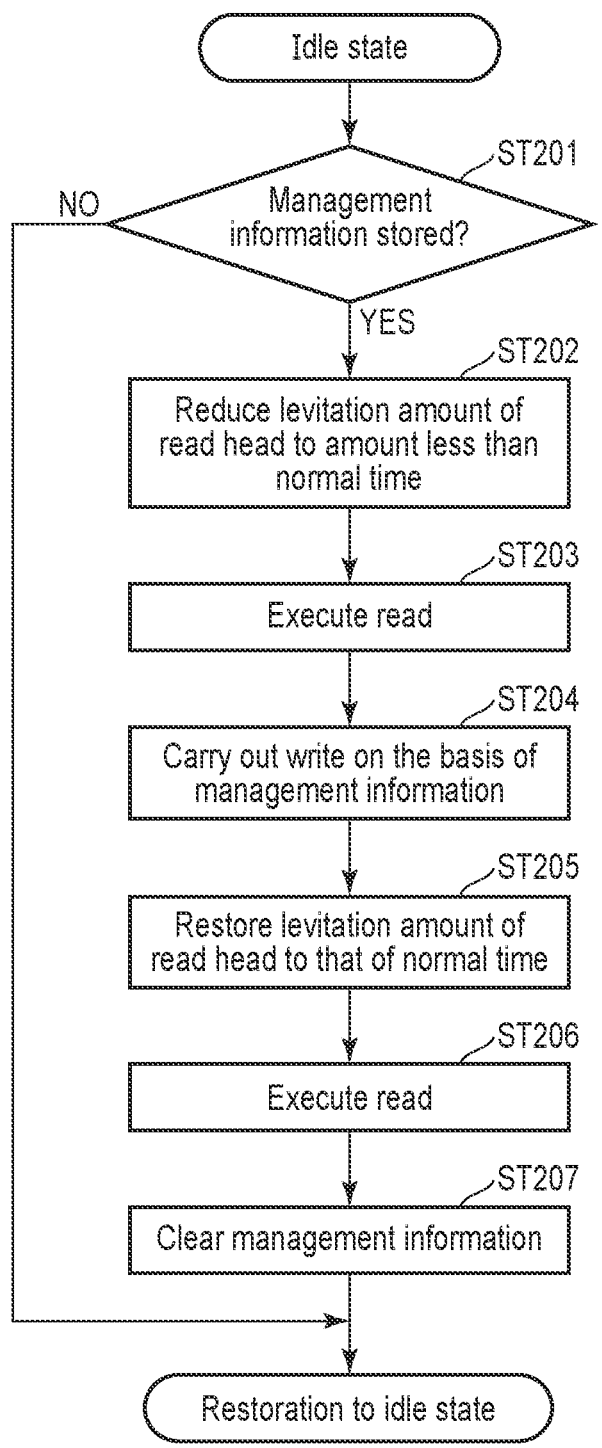
FIG. 10 is a flowchart showing an example of rewrite processing of data to be executed by the MPU according to the embodiment.

Next, the processing of rewriting data will be described. As already described previously, in the case where vibration or the like is applied to the magnetic disk device 200, and the offset amount of the write head 10W exceeds the first threshold and is within the second threshold, data is written by the magnetic field suppression control. In this case, data is written by the magnetic field suppression control, and hence there is a possibility of a case where the data write quality is inferior to the quality at the normal write time occurring. Accordingly, in the magnetic disk device 200, processing of reading the data and further writing the read data is executed. FIG. 10 is a flowchart showing an example of data rewrite processing to be executed by the MPU 60. It is assumed in this embodiment that this processing is executed in an idle state.

At the time of an idle state, the MPU 60 determines whether or not management information is stored (ST201). More specifically, at the time of the idle state, the MPU 60 refers to the management information storage section 73 to thereby confirm whether or not the management information is stored. Upon determination that the management information is stored (ST201: YES), the MPU 60 reduces the levitation amount of the read head 10R to an amount less than the normal time (ST202). In the state where the levitation amount of the read head 10R is reduced as described above, the MPU 60 executes read of data (ST203). That is, the MPU 60 reads data from the magnetic disk 1 on the basis of the address (area) stored in the management information.

Next, the MPU 60 carries out write on the basis of the management information (ST204). The MPU 60 writes the data read from the address stored in the management information to the data area 110. Next, the MPU 60 restores the levitation amount of the read head 10R to that of the normal time (ST205). In this state, the MPU 60 executes read (ST206). That is, the MPU 60 confirms whether or not the written data can be read with the levitation amount at the normal read time held.

Next, the MPU 60 clears the management information (ST207). After the management information stored in the management information storage section 73 is cleared as described above, the state is restored to the idle state. It should be noted that when it is determined in already-described step ST201 that management information is not stored (ST201: NO), the idle state is continued.

As described above, it is possible for the magnetic disk device 200 to rewrite the data written by the magnetic field suppression control. Accordingly, the magnetic disk device 200 can improve the data write quality. Further, rewrite of the data is executed in the idle state, and hence it is possible to lighten the processing burden of the magnetic disk device 200. It should be noted that rewrite of the data may be executed in a state other than the idle state, i.e., at the time when the processing load of the magnetic disk device 200 is light. Furthermore, the data rewrite processing may forcibly be executed at predetermined timing. The predetermined timing in this case is, for example, timing before executing so-called refresh processing.

Further, although in the embodiment described above, the magnetic disk device 200 has been described about the case where the magnetic disk device 200 includes the two thresholds of the first threshold and second threshold as the thresholds specifying whether or not magnetic field suppression should be executed, the case is not limited to this. The magnetic field suppression control may be changed at each stage by using three or more thresholds.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   a magnetic head including a read head which reads data from the magnetic disk, a write head which writes data to the magnetic disk, and a heater which adjusts an amount of levitation of each of the read head and the write head relative to the magnetic disk;
   an electric power supply section which supplies electric power to the read head, the write head, and the heater;
   a control section which controls read/write of data from/to the magnetic disk and suppresses a magnetic field range of the write head according to an offset amount of the write head at the time of write of the data; and
   an address storage section which stores therein an address of the magnetic disk to which data is written by suppressing the magnetic field range, wherein
   the control section reads data from the magnetic disk by means of the read head on the basis of the address stored in the address storage section at predetermined timing, and writes the read data to the magnetic disk by means of the write head without suppressing the magnetic field range.

2. The device of claim 1, further comprising:
   a threshold storage section which stores a first threshold specifying the offset amount, and a second threshold greater than the first threshold, wherein
   at the time of write of data, the control section carries out magnetic field suppression to thereby continue write of the data until the second threshold is exceeded even when the first threshold is exceeded and, when the second threshold is exceeded, inhibits write of the data.

3. The device of claim 1, wherein
   the control section controls the electric power supply section to adjust a voltage to be applied to the heater and adjust an amount of levitation of the write head relative to the magnetic disk, whereby the control section carries out magnetic field suppression at the time of write of the data.

4. The device of claim 1, wherein
the control section controls the electric power supply section to adjust a current to be supplied to the write head, whereby the control section carries out magnetic field suppression at the time of write of the data.

5. The device of claim 1, further comprising:
a state information storage section which stores state information indicating a state of a disk surface of the magnetic disk, wherein
the control section changes the magnetic field suppression on the basis of the state information stored in the state information storage section with respect to an area to which the data is written.

6. The device of claim 5, wherein
the state information storage section is provided on the magnetic disk.

7. The device of claim 5, wherein
the state information includes information items respectively indicating surface unevenness and a convex part.

8. The device of claim 1, wherein
when reading data from the magnetic disk by means of the read head on the basis of the address stored in the address storage section, the control section adjusts the voltage to be applied to the heater to thereby reduce the amount of levitation of the read head relative to the disk surface of the magnetic disk to an amount less than in the case where another data item is to be read.

9. The device of claim 1, wherein
the predetermined timing is the time when the magnetic disk device is in an idle state.

10. The device of claim 1, wherein
when the control section writes the read data to the magnetic disk by means of the write head without carrying out magnetic field suppression, the control section clears an address stored in the address storage section and corresponding to the data.

* * * * *